No. 710,952. Patented Oct. 14, 1902.
M. CONWAY.
HIDE SCRAPING MACHINE.
(Application filed Apr. 18, 1900.)

(No Model.) 3 Sheets—Sheet 1.

Witnesses,

Inventor,
Michael Conway,
By Offield, Towle & Linthicum
Attys.

No. 710,952. Patented Oct. 14, 1902.
M. CONWAY.
HIDE SCRAPING MACHINE.
(Application filed Apr. 18, 1900.)

(No Model.) 3 Sheets—Sheet 3.

Witnesses,
Inventor,
Michael Conway
By Offield Towle Linthicum
Atty's.

UNITED STATES PATENT OFFICE.

MICHAEL CONWAY, OF CHICAGO, ILLINOIS.

HIDE-SCRAPING MACHINE.

SPECIFICATION forming part of Letters Patent No. 710,952, dated October 14, 1902.

Application filed April 18, 1900. Serial No. 13,288. (No model.)

*To all whom it may concern:*

Be it known that I, MICHAEL CONWAY, of Chicago, Illinois, have invented certain new and useful Improvements in Hide-Scraping Machines, of which the following is a specification.

This invention relates to improvements in hide-scraping machines, and refers more specifically to a machine particularly adapted for scraping or cleaning the fat and other meat from the flesh side of hog-skins, although capable of use or adaptation to other analogous purposes.

The object of the invention is to provide a simple and efficient machine of the character referred to which is so constructed as to remove the fat and other meat in successive portions without injury to the hides; to carry out the successive scraping or denuding operations in a continuous and practically single operation; to so construct and arrange the mechanism that the hide after being once placed in the machine will thereafter require no further manipulation on the part of the operator, but will be completely scraped and delivered automatically; to provide means whereby the scrapings removed from the hide will be discharged into proper receptacles, while the hide itself is delivered to another point; to provide a machine which will operate upon any ordinary-sized piece of hide, from a small fragment to a full-sized hide, regardless of its particular shape, without change of adjustment of the mechanism, and to provide a generally simplified and improved machine.

To the above ends the invention consists in the matters hereinafter described, and more particularly pointed out in the appended claims, and its use and operation will be readily understood from the following description, reference being had to the accompanying drawings, in which—

Figure 1:
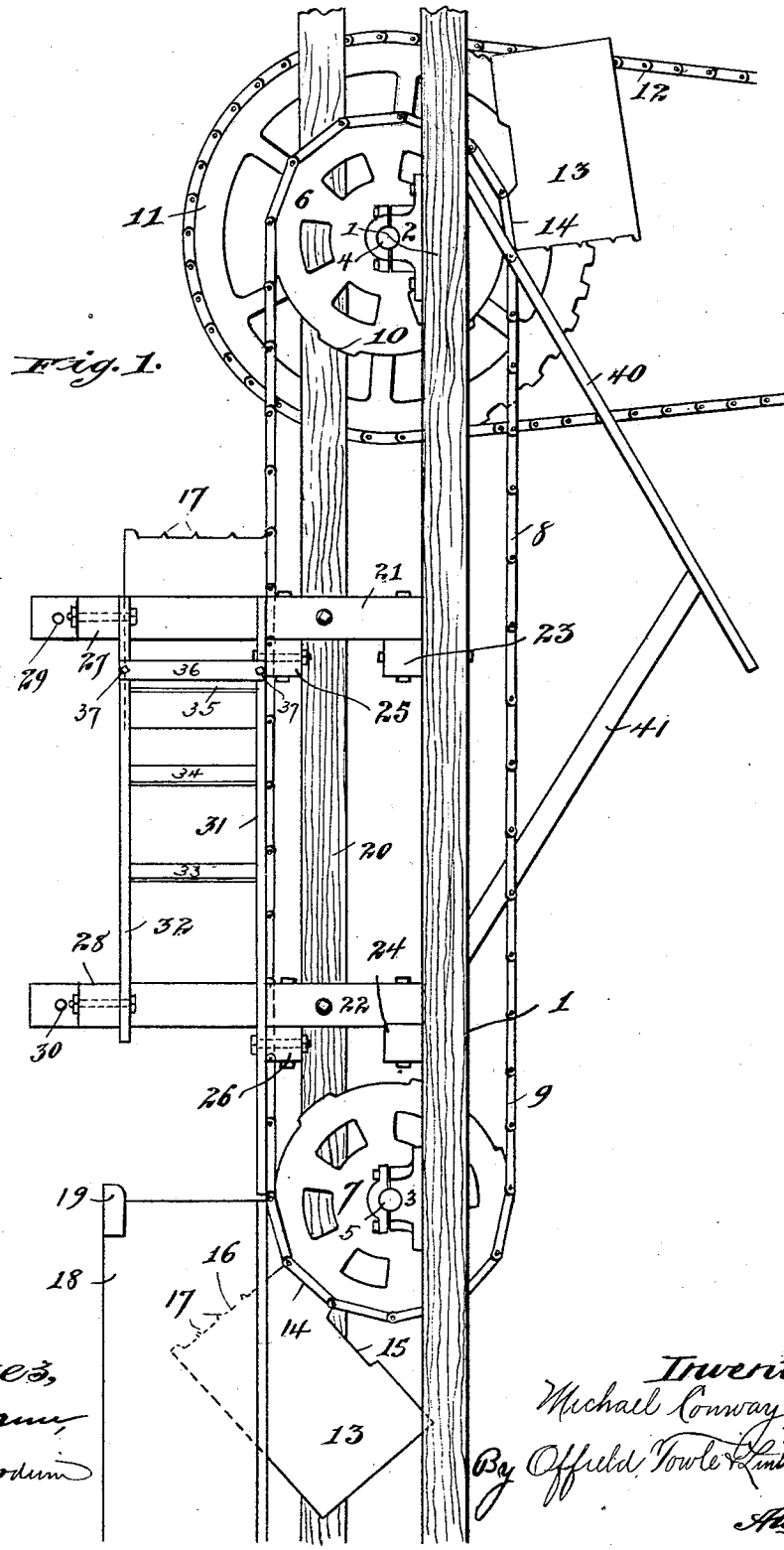
Figure 2:
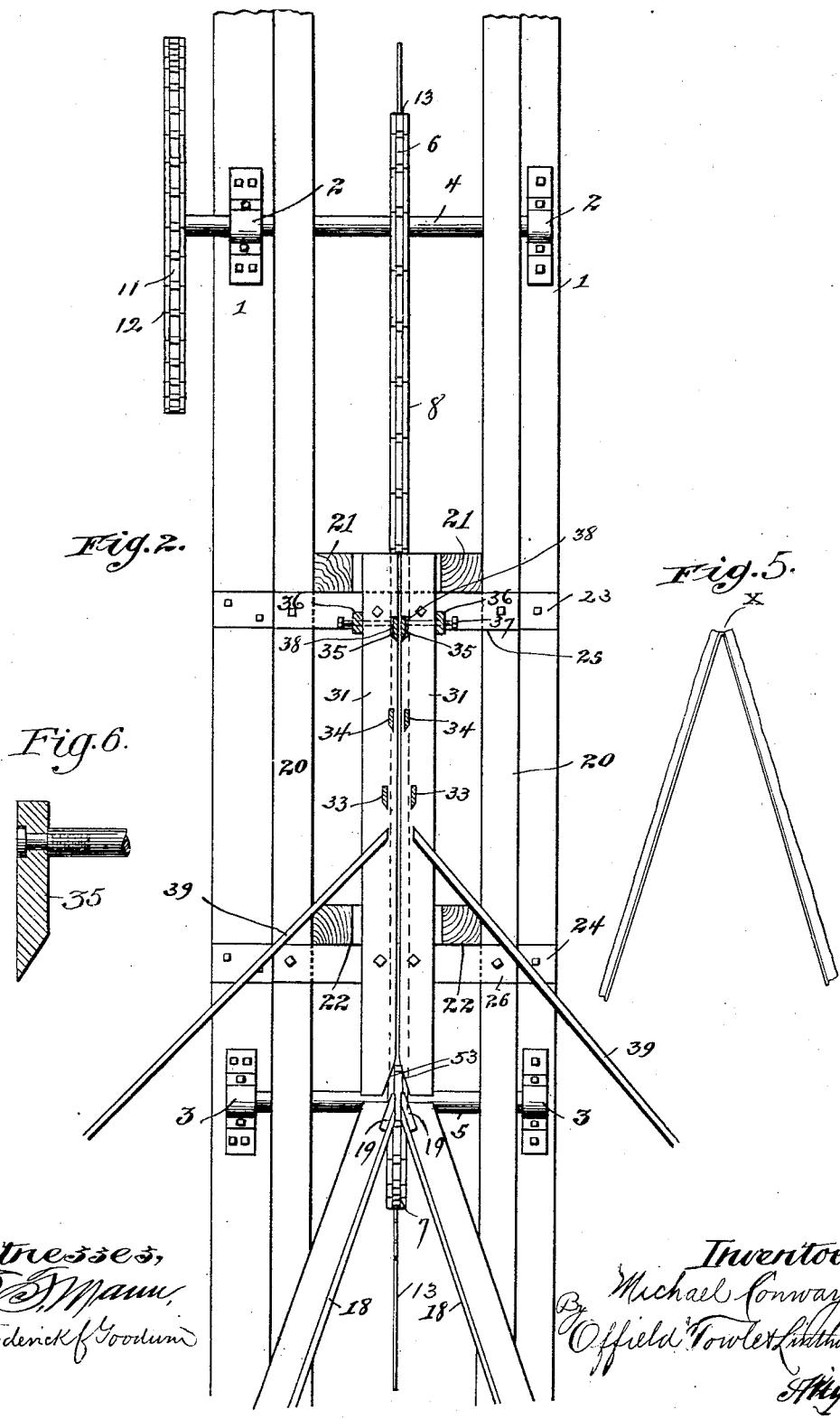
Figure 3:
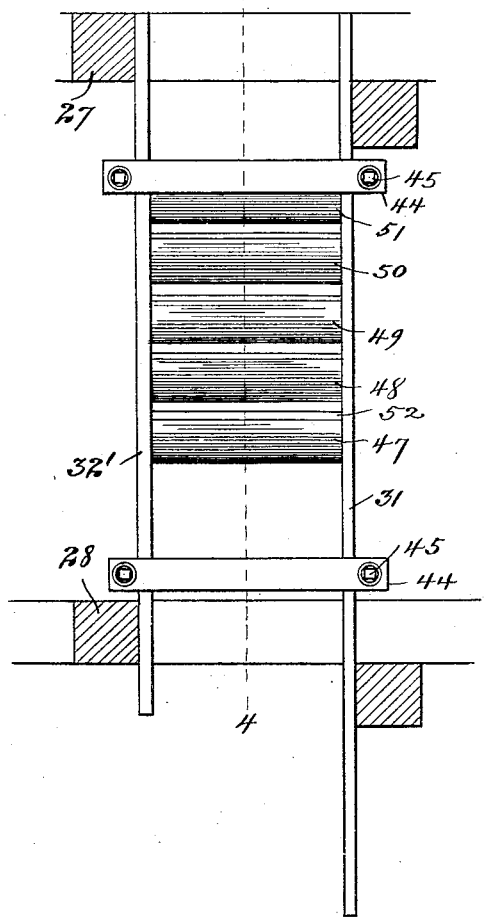
Figure 4:
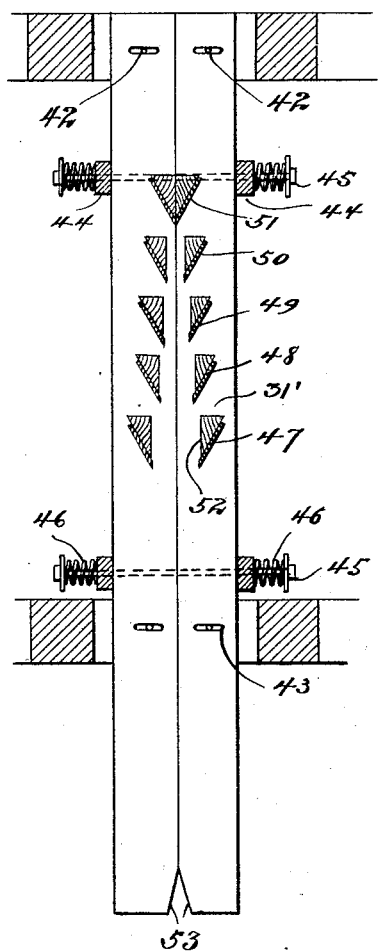

Figure 1 is a side elevation of a machine embodying my invention. Fig. 2 is a front elevation of the same. Fig. 3 is a detail side view of a modification, showing one set of scraping-knives mounted in their supporting-frame, certain parts of the main frame being shown in section. Fig. 4 is a sectional view taken on line 4 4 of Fig. 3. Fig. 5 is an edge view of a hide bent into the form in which it is placed upon the support from which it is picked up by the carrier, and Fig. 6 is a sectional detail showing the swiveling connection between one of the scraper-knives and its support.

In the particular instance illustrated the invention is shown as embodied in a vertical machine, and for certain purposes this machine will be found most advantageous.

Referring to the drawings, 1 1 designate two upright frame members, which may be conveniently secured in position by engagement with the ceiling and working floor, respectively, of the room in which the machine is arranged, said frame members being arranged at some distance apart and parallel with each other, as best indicated in Fig. 2. Upon said frame members are mounted in suitable bearings 2 2 and 3 3 upper and lower horizontal shafts 4 5, respectively.

6 7 designate sprocket-wheels mounted upon the shafts 4 5, respectively, at points in vertical alinement with each other and intermediate of the lengths of said shafts.

8 designates a chain or link belt composed of relatively long links 9, adapted to engage the correspondingly-shaped teeth 10 of the sprocket-wheels. In order that the link belt may be positively driven, the sprocket-wheel 6 is mounted rigidly upon the shaft 4, and this latter shaft is driven by any suitable connection, that shown herewith consisting of a second sprocket-wheel 11, mounted rigidly upon one end of the shaft 4 and driven by means of a link belt operated from any suitable source of power.

Upon the link belt 8 are mounted a plurality of carriers 13, each consisting of a sheet-metal blade, preferably of approximately rectangular form and having one of its side margins attached rigidly to one of the links at a point adjacent to that end of the carrier which will be the forward end in the operation of the machine, as indicated at 14 in Fig. 1. Immediately in rear of the portion 14, which is attached rigidly to the link 9, is formed a recess 15, to accommodate the sprocket-teeth of the several sprockets as the carrier is carried around the latter. The front ends 16 of the carriers are desirably and as shown herein arranged to extend at right angles to the links 9, to which they are attached, so that when the carrier is being carried vertically upward said front end will be in horizontal position.

In the operation of the machine the hide or piece of hide to be treated is folded together with the hair side inward, as indicated in Fig. 5, and placed upon the carrier in such position that the forward edge of the latter will engage the hide at the point of the fold, as indicated at $x$, and in order that the carrier may positively engage the hide, so as to prevent any tendency of the latter from shifting laterally one way or the other, the said forward edge is provided with a plurality of short teeth or projections 17, arranged at intervals apart throughout the width of the carrier. In order to facilitate the adjusting of the hides upon the carriers, a divided support is arranged at the front of the machine, consisting of two boards or plates 18, arranged to stand upon the working floor in inverted-V-shape relation to each other and having their upper ends held separated just sufficiently to permit the passage of the carriers edgewise therebetween, the upper edges of said supports being horizontal and arranged desirably at a height approximately on a level with the center of the lower sprocket-wheel, so that the forward edge of the carrier will have assumed a horizontal position before it emerges from between said supports. The operator simply lays the hide or piece of skin across the upper edges of the supports 18 in folded position, as hereinbefore described, and the carrier in its upward movement picks the hide up from the support and carries it upwardly. In order to facilitate the proper adjustment of the piece of hide upon the supports, the latter are desirably provided with a pair of guides or projections 19 at their outer upper angles, which serve to determine the outer limit to which the hide can be moved and still be in position to be properly engaged by the knives, as will hereinafter be described. From the supports 18 the hide is carried vertically upward by the carrier between a set of scraping-knives arranged at opposite sides of the path of the carrier and preferably in pairs opposite to each other.

20 20 designate a second pair of timbers arranged parallel with each other at a suitable distance apart and preferably and as shown herein just in rear of the front lap of the carrier-belt.

21 21 and 22 22 designate upper and lower pairs of horizontal supports bolted to the timbers 20, so as to extend horizontally beyond the front lap of the belt parallel with each other, the rear ends of said supports being conveniently secured to the upper sides of cross-bars 23 24, respectively bolted to the frame-timbers 1 1.

25 26 represent a second pair of cross-timbers, respectively bolted to the under sides of the horizontal supports 21 and 22 at points immediately in front of the uprights 20, and 27 28 designate still another pair of cross-timbers secured between the outer ends of the respective pairs of horizontal supports 21 and 22. (See sectional, Fig. 3.) The ends of the horizontal supports 21 and 22 are extended a short distance beyond the cross-bars 27 28 in order that bolts 29 30 may be extended through the several pairs to clamp the frame members rigidly together. Upon the horizontal frame structures thus provided is supported the knife-frame proper, comprising a pair of plates 31, secured side by side at a slight distance apart against the front faces of the cross-bars 25 26 and desirably arranged to extend below the latter to a point near the upper edge of the hide-supports 18 and a second pair of similar plates or bars 32 similarly secured side by side to the rear surfaces of the cross-bars 27 and 28, this latter pair of plates terminating at their lower ends just below the cross-bar 28.

33, 34, and 35 designate scraping-knives seated at their ends in and arranged to extend between the supporting-plates 31 and 32 at the respective sides of the machine, said knives being preferably and as shown herein arranged horizontally opposite each other and the pairs 33, 34, and 35 arranged successively closer together, so that the hide in passing therebetween will be reduced in thickness or have the flesh scraped therefrom in successive layers. In the particular construction shown in Figs. 1 and 2 the two lower pairs of knives 33 and 34 are made stationary in the knife-frame; but means are provided for adjusting the uppermost pair of knives 35, so that they may be suitably spaced apart to accommodate hides of varying thickness. To this end bars 36 are mounted upon the outer edges of the knife-supporting plates at the respective sides of the machine at points horizontally opposite the upper pair of knives, and within said bars 36 are seated adjusting-screws 37, which extend horizontally inward through said bars and engage at their inner ends with the knives 35 at the respective sides of the frame. In order to afford a positive adjustment in both directions through the medium of said screws, the latter have screw-threaded engagement with the bars 36 and swiveling engagement at their ends with the respective knives, the latter being seated in suitable recesses or notches 38, formed in the frame-plates 31 and 32, which permit the lateral movement of the blades, but support them against upward edgewise movement.

In the operation of the machine the fat and meat shaved from the flesh side of the hides by means of the several pairs of knives drop downwardly and outwardly therefrom, and in order that this product may be directed into suitable receptacles guide-boards 39 are mounted at the respective sides of the machine, having their upper ends arranged immediately adjacent to the path of the carriers and extending from points just below the lowermost pair of knives obliquely downward and outwardly, as indicated clearly in the drawings. The hide after having been properly scraped by being carried between the several pairs of knives is carried over the upper sprocket-wheel and discharged from the carrier or rather permitted to fall by gravity therefrom when the carrier is reversed in its downward or return movement. In order that the hides may be deflected downwardly away from the machine, a pair of guides 40 are arranged at the opposite sides of the path of the carrier at a suitable distance apart to permit the passage of the latter therebetween, said guides being arranged to extend from points near the upper end of the carrier-belt obliquely downward and outwardly, as indicated clearly in Fig. 1, and being conveniently supported at their lower ends by means of braces 41, extending upwardly from the machine-frame.

The operation of the machine constructed as thus described has been clearly indicated in connection with the foregoing description, but may be briefly repeated as follows: The uppermost pair of knives having been properly adjusted to suit the particular class of hides which is to be treated, the operator takes the pieces one by one and lays them across the supports 18 in position to be picked up by the carrier, preferably drawing a knife across the point of fold, so as to sever the fat down to the hide proper, as indicated clearly in Fig. 4. The carrier in its upward movement picks up the hide and carries it positively between the several knives, which remove the fat and other flesh, if such be present, in successive layers, thus avoiding any undue strain on that part of the hide engaged by the carrier which might tend to cut the hide in case the attempt were made to remove the flesh at a single cut or might tend to force the hide against the knives with sufficient pressure to cause the latter to cut the hide itself. It will be obvious that the several hides or hide-sections will be automatically discharged from the carriers when the latter are reversed in their return movement and that the operation of the machine therefore requires no attention on the part of the operator other than simply placing the hides or pieces of hide in position upon the supports. It will be further obvious that small or irregular-shaped pieces will be dressed as readily as any, the only requirement being that the operator shall place the pieces in such position upon the carrier that the action of the knives shall be approximately equal upon the opposite sides of the carrier, so that the action of the knives shall not be so far unbalanced or greater upon one side than the other as to tend to pull the hide from the front end of the carrier in spite of the teeth thereon.

In Fig. 4 is shown a modification in which the knife-frames are yieldably supported upon the main frame in such manner that each set of knives may yield outwardly. To this end the knife frame-plates 31 and 32 are movably supported upon the frame-timbers by means of bolts 42, which extend through horizontal slots 43, which permit the said plate members to move laterally, and in order to hold the latter yieldingly together presser-bars 44 are arranged in pairs at opposite sides thereof and connected by means of bolts 45, made to extend at their ends some distance beyond the presser-bars at the respective sides of the frame and having coiled springs 46 interposed between the outer surfaces of the bars and the headed ends of the bolts, so as to exert an inward pressure upon the plates. The several pairs of knives 47, 48, 49, 50, and 51 are mounted upon stationary cross-bars 52, extending between the front and rear frame-plates at the respective sides and are arranged in horizontally-opposite pairs and successively nearer to the meeting edges of the frame-plates substantially as in the preceding construction. The lower ends of the knife-supporting plates are beveled or cut away at their meeting edges, as indicated at 53, so as to facilitate the entrance of the carriers therebetween. The operation of the machine equipped with this arrangement of knives is not substantially different from that of the machine described before.

From the foregoing description it will be seen that I attain the several objects of my invention in a simple, efficient, and inexpensive manner and that a machine embodying my invention is capable of adaptation to a wide variety of uses other than the particular use herein described. I do not, therefore, wish to be limited to the precise details of construction described herein except as they may be made the subject of specific claims.

I claim as my invention—

1. In a machine of the character described, a hide-carrier having an extended substantially flat surface adapted to support the hide, means located at the advance part of said carrier for holding the hide thereon and a plurality of scraping-knives mounted adjacent to the path of the carrier one in rear of another so as to act upon the hide successively.

2. In a machine of the character described, a supporting-frame, a hide-carrier mounted to travel thereon, comprising a flat support of extended area upon which the hide is adapted to rest, and provided with means for holding the hide in position upon the carrier, said means being located at the advance end of the carrier and a plurality of scraping-knives mounted adjacent to the path of the carrier to act upon the hide in successive order, each succeeding knife being arranged closer to the hide than the preceding one.

3. In a machine of the character described, a supporting-frame, a hide-carrier comprising a flat blade, and a traveling support upon which said blade is mounted in position to be carried forward edgewise, and a pair of scraping-knives mounted on opposite sides of, and adjacent to, the path of movement of said carrier, substantially as described.

4. In a machine of the character described, a supporting-frame, a pair of guide-wheels mounted thereon, an endless carrier mounted upon said guide-wheels, a hide-carrier consisting of a flat blade connected with said endless carrier in position to move forward edgewise, and a pair of scraping-knives arranged at opposite sides of, and adjacent to, the path of the carrier, substantially as described.

5. In a machine of the character described, a supporting-frame, a pair of sprocket-wheels mounted thereon, a link belt mounted upon said sprocket-wheels, a plurality of hide-carriers mounted upon said link belt, each consisting of a flat blade having its forward end arranged to extend substantially at right angles to the lap of the belt to which it is connected when the latter is stretched or extended between the sprocket-wheels, a plurality of pairs of scraping-knives arranged at opposite sides of and adjacent to the path of said carriers, and means for operating one of said sprocket-wheels positively.

6. In a machine of the character described, a supporting-frame, a pair of sprocket-wheels mounted thereon, a link belt mounted upon said sprocket-wheels, a plurality of hide-carriers mounted upon said link belt, each consisting of a flat blade having its forward end arranged to extend substantially at right angles to the lap of the belt to which it is connected when the latter is stretched or extended between the sprocket-wheels, a plurality of pairs of scraping-knives arranged at opposite sides of and adjacent to the path of said carriers, and means for operating one of said sprocket-wheels positively, that portion of the belt which extends past the sets of scraping-knives being arranged to move vertically upward in its forward movement whereby the hides will be held by gravity in position upon the carriers.

7. In a machine of the character described, a supporting-frame, a pair of sprocket-wheels mounted thereon, a link belt mounted upon said sprocket-wheels, a plurality of hide-carriers mounted upon said link belt, each consisting of a flat blade having its forward end arranged to extend substantially at right angles to the lap of the belt to which it is connected when the latter is stretched or extended between the sprocket-wheels, a plurality of pairs of scraping-knives arranged at opposite sides of and adjacent to the path of said carriers, means for operating one of said sprocket-wheels positively, that portion of the belt which extends past the sets of scraping-knives being arranged to move vertically upward in its forward movement whereby the hides will be held by gravity in position upon the carriers, and a divided stationary hide-support arranged adjacent to the link belt, upon which the pieces of hide may be placed in position to be picked up by the carriers.

8. In a machine of the character described, the combination with a supporting-frame, a pair of guide-wheels arranged vertically above each other thereon, an endless belt mounted upon said guide-wheels, a hide-carrier blade mounted upon said endless belt, and scraping-knives arranged adjacent to the path of the carrier, of a guide or deflector arranged adjacent to the descending part of the endless belt in position to receive the pieces of hide from the carrier-blade and to direct the same outwardly away from the belt, substantially as described.

9. In a machine of the character described, the combination of a supporting-frame, and a hide-carrier consisting of a flat blade mounted to travel upon said frame, of a pair of scraping-knives yieldably mounted adjacent to and at opposite sides of the path of the carrier, and adapted to scrape the hide upon opposite sides of the carrier as the latter is carried therebetween.

10. In a machine of the character described, the combination with a supporting-frame, a pair of guide-wheels mounted thereon, an endless belt trained about said guide-wheels, and a hide-carrier consisting of a flat blade mounted upon said endless belt, of a pair of scraping-knives arranged opposite each other adjacent to and at opposite sides of the path of the hide-carrier, and springs acting upon said blades to force them toward each other, as and for the purpose described.

11. In a machine of the character described, the combination with a link belt and sprocket-wheels around which the belt is trained, of a hide-carrier consisting of a flat metal blade having a portion of one of its lateral edges adjacent to its forward end connected rigidly with one of the links of the belt, and having its edge suitably conformed in rear of said attached portion to adapt it to pass around the sprocket-wheels, the forward edge of said blade being constructed to extend substantially at right angles to the link, and being provided with teeth, substantially as and for the purpose described.

12. In a machine of the character described, the combination of a pair of upright frame-timbers arranged parallel with each other and in transverse alinement, upper and lower transversely-extending shafts mounted in bearings upon said frame-timbers, a sprocket-wheel upon each of said shafts, an endless link belt trained around said sprocket-wheels, a drive-wheel operatively connected with one of said shafts, a plurality of blade hide-carriers mounted at intervals apart upon said belt, a knife-supporting frame supported from the frame-timbers adjacent to the upwardly-moving lap of the belt, a plurality of pairs of scraping-knives mounted in said knife-supporting frame, said knives being arranged in pairs horizontally opposite each other and at intervals apart vertically, the knives of each pair being arranged successively closer to the path of the carriers from the lowermost pair upwardly, and a divided stationary hide-support arranged adjacent to the lower end of the upwardly-moving lap of the belt in position for the carriers to pass therethrough, the upper edge of said hide-support being substantially horizontal, and the opposite sides arranged to diverge from said upper edge downwardly, substantially as described.

13. In a machine of the character described, a hide-carrier having an extended area or supporting-surface arranged substantially parallel with the path of movement of the carrier past the scraper and adapted to support the hide and a scraping-knife, mounted adjacent to the path of the carrier and adapted to act upon the hide.

MICHAEL CONWAY.

Witnesses:
ALBERT H. GRAVES,
DENIS CAREY.